United States Patent [19]

Bowles

[11] 4,217,087

[45] Aug. 12, 1980

[54] ISOSTATIC APPARATUS FOR TREATING ARTICLES WITH HEAT AND PRESSURE

[75] Inventor: Arnold G. Bowles, Jenkintown, Pa.

[73] Assignee: Pressure Technology, Inc., Meadowbrook, Pa.

[21] Appl. No.: 57,859

[22] Filed: Jul. 16, 1979

[51] Int. Cl.² .......................... B29C 3/00; B30B 11/00; B22F 3/14

[52] U.S. Cl. .................................. 425/78; 425/405 H

[58] Field of Search ........................ 425/405 H, 405 R; 148/131; 266/5

[56] References Cited

U.S. PATENT DOCUMENTS

| | | | |
|---|---|---|---|
| 3,168,607 | 2/1965 | Greene | 266/5 |
| 3,249,964 | 5/1966 | Shaler | 425/78 |
| 3,419,935 | 1/1969 | Pfeiler et al. | 425/405 H X |
| 3,571,850 | 3/1971 | Pohto | 425/405 H |
| 3,599,281 | 8/1971 | Boyer | 425/78 X |
| 3,748,196 | 7/1973 | Kemeny | 148/131 |
| 4,009,977 | 3/1977 | Chao | 425/405 H X |
| 4,032,337 | 6/1977 | Boyer | 425/405 H X |
| 4,151,400 | 4/1979 | Smith et al. | 425/405 H X |

*Primary Examiner*—J. Howard Flint, Jr.

*Attorney, Agent, or Firm*—Robert P. Seitter; Thomas M. Ferrill, Jr.

[57] ABSTRACT

A method of and apparatus for treating articles with heat and pressure is disclosed. Included in the apparatus is a furnace in which the articles are to be treated. The articles are placed in the furnace and, the furnace is evacuated, then filled with an inert gas the pressure and temperature of which is raised to predetermined levels. These predetermined levels are maintained for a period of time sufficient to effect the treatment, and, thereafter the inert gas is circulated to promote cooling of the gas and reduce the cooling time of the furnace and the article treated.

9 Claims, 2 Drawing Figures

ISOSTATIC APPARATUS FOR TREATING ARTICLES WITH HEAT AND PRESSURE

Figure 1:
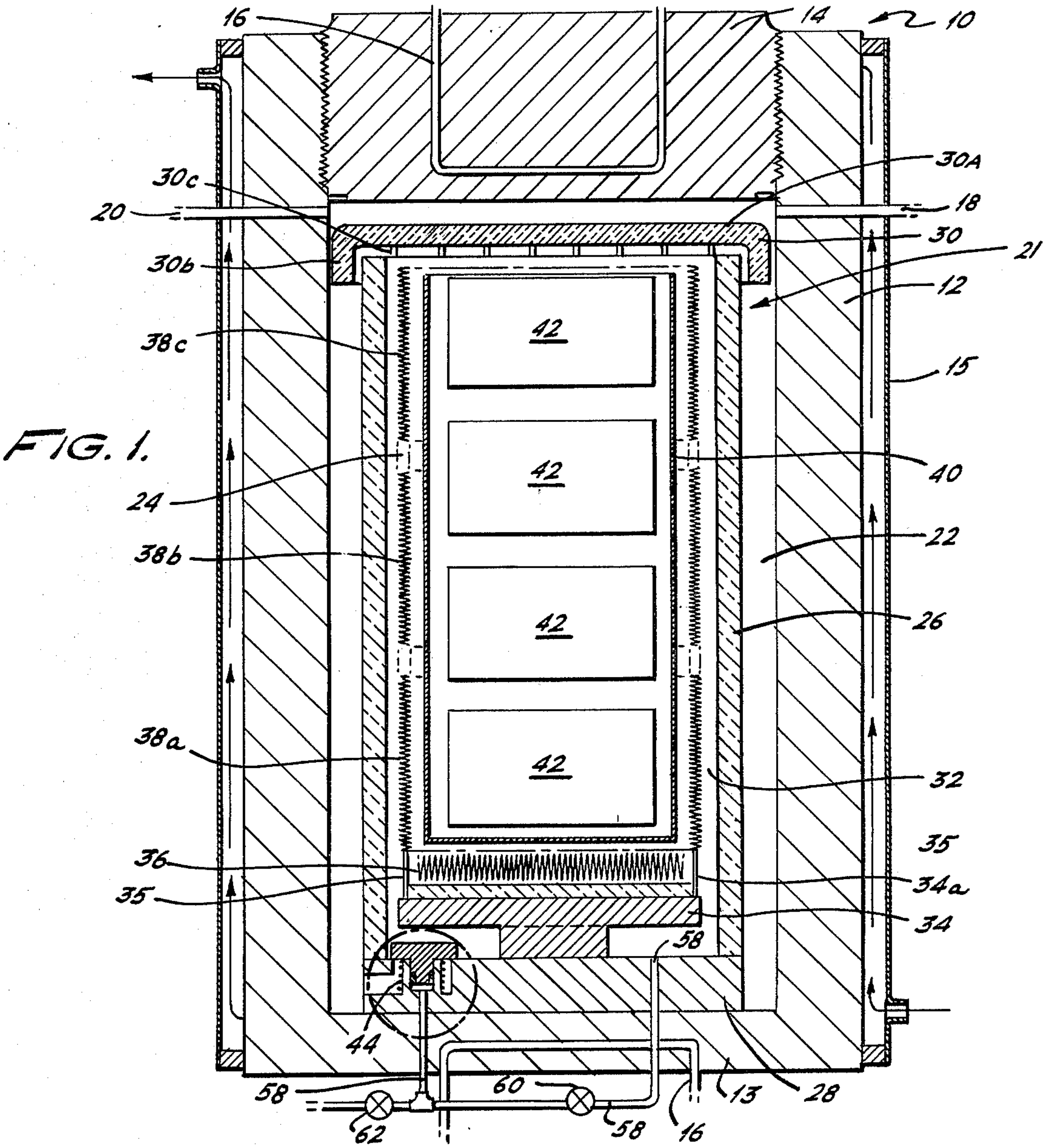

This invention relates to hot isostatic presses for treating articles with heat and pressure. More particularly, this invention relates to hot isostatic presses for treating articles wherein the cycle time of the treatment is reduced.

Hot isostatic presses are used to treat or produce various metallic, ceramic and similar articles by subjecting the articles to relatively high pressure while they are in a hot plastic state. In the case of certain castings, small internal voids in the article are squeezed closed improving reliability of the casting; in the case of articles made from powder metals or ceramic powder, the powder is similarly treated to cause consolidation of the powder into fully dense articles.

These press systems generally include a pressure vessel surrounded by cooling means and a furnace-insulation module forming an inner treatment chamber in which the article to be treated is placed. Heating means is provided in the inner chamber and the chamber is connected to means for evacuating the chamber and means for feeding an inert gas thereto. The temperature and pressure of the gas are raised to predetermined levels, for example, pressures typically of 15,000 p.s.i. and temperatures typically of 2000° C., to provide a desired environment in which the articles are treated. It should be understood that in some instances, pressures and temperatures can be significantly higher or lower depending on the nature of the material being processed. The desired conditions are maintained for a predetermined period of time and, thereafter, the furnace is allowed to cool down and pressure is reduced so that the processed article can be removed.

In one typical operating cycle, it has been found that it took about three hours to raise the temperature and pressure of the gas to the desired conditions. Actual treatment time took about two hours and the cooling time took about thirteen hours. Total cycle time was thus eighteen hours. This is a typical cycle in that the cooling down time is the major portion of the cycle time, and does not contribute to the beneficial effect of the process. It should be understood, of course, that this cooling time renders the press unusable for treating articles for lengthy periods of time and is thus inefficient and expensive.

Accordingly, it is an object of this invention to provide an apparatus for treating articles with relatively high heat and pressure in which the cycle time is significantly reduced.

It is another object of this invention to provide a hot isostatic press including an arrangement for cooling same whereby the cooling time is significantly reduced.

It is another object of this invention to provide a hot isostatic press including valve means located in a low temperature portion of the press for causing the gas in the press to be circulated to promote rapid cooling thereof.

Finally, it is an object of this invention to provide a simple, economical and efficient means for treating articles with high temperature and pressure.

These and other objects of this invention are accomplished by providing a hot isostatic press comprising a combination pressure vessel-furnace member forming an interior chamber and associated with cooling means adjacent its outer surface. The interior chamber is associated with first means for evacuating the same and with second means for introducing an inert gas thereto. Heat insulating mantle means divides the interior chamber into an inner chamber portion and an outer chamber portion with the inner chamber portion being operatively associated with heating means. There is also provided valve means, preferably in a low temperature portion of the chamber, for preventing or allowing the circulation of the gas between the inner and outer chamber portions. Circulation of the hot gas from the inner chamber portion to the outer chamber portion causes cooling of the press system and articles therein and reduces the cooling time.

Thus, it can be seen that the method includes the steps of placing an article to be treated into the interior chamber of a hot isostatic press, evacuating the chamber and introducing an inert gas thereto. The pressure and temperature of the gas are raised to predetermined levels and these levels are maintained for a predetermined period of time to treat the article in a desired manner. Thereafter, the valve means is operated to allow the circulation of the gas between the inner and outer chamber portions whereby the cooling time is significantly reduced.

Figure 2:
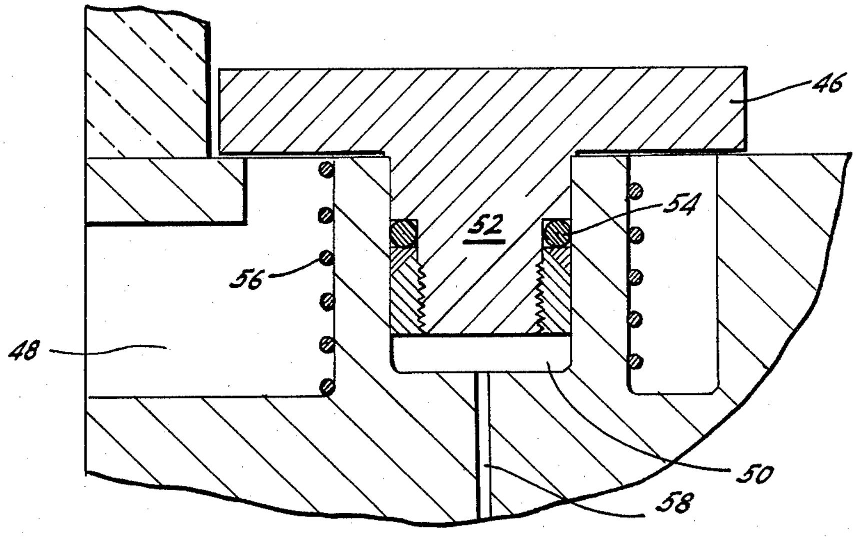

For a better understanding of the invention, reference is made to the following description of a preferred embodiment thereof taken in conjunction with the figures in the accompanying drawing, in which:

FIG. 1 is a section view taken along the lingitudinal axis of a hot isostatic press in accordance with this invention; and FIG. 2 is an enlarged view of the circled portion of FIG. 1 and showing a valve member usable with this invention.

Referring to FIG. 1 of the drawing, there is illustrated a hot isostatic press 10 in accordance with this invention. The press 10 includes a pressure vessel 12 which is of a cylindrical configuration extending from a base 13 and which has its other end closed by a suitable pressure plug 14 to form an inner chamber. The pressure plug 14 can be any conventional such device including seal means effective at high pressures. Surrounding the cylindrical pressure vessel wall is a cooling jacket 15 and formed in the base 13 and the end plug 14 are cooling passages generally shown at 16 which passages form along with the cooling jacket a circulating system for circulating coolant. As will be understood, the furnace chamber is heated to a relatively high temperature so that the coolant keeps the surface temperature of the pressure vessel at reasonable and safe levels.

Also included is a passage 18 extending through the furnace wall to the interior chamber and which is connected to a vacuum pump (not shown) or similar apparatus for evacuating the interior chamber of the furnace. Another passage 20 extends trhough the furnace wall to the interior chamber and is connected to a source of an inert gas (not shown). Included in this gas source is a compressor (also not shown) or, other pressurizing means for feeding the inert gas to the interior chamber of the furnace and raising the pressure therein to a high pressure for purposes to be explained hereinafter. Inert gas is desirable because air can cause oxidation of articles being treated or of various furnace parts at the high temperatures achieved in the furnace. Argon or helium is the preferred inert gas with argon being favored because it is cheaper. It should be understood that other gases or combination of gases can be utilized with this invention.

Located in the chamber is a heat insulating mantle means shown generally at 21 that divides the chamber into a first outer chamber portion 22 and a second inner chamber portion 24. The mantle 21 includes a cylindrical heat insulating member 26 located concentrically within the pressure vessel 12. At its lower end, the cylindrical heat insulating member 26 sits on a base member 28 and is effectively sealed thereto. The upper end of the cylinderical heat insulating member 26 supports an inverted cup shaped heat insulating member 30 having a circular planar portion 30*a* and a flange portion 30 *b* extending therefrom. The inner surface of the circular portion 30*a* is formed with a plurality of spaced apart struts 30*c* located radially inwardly from the flange 30 a distance such that the struts 30*c* support the member 30 on the top end of the cylindrical heat insulating member 26. The inner periphery of the flange 30*b* has a significantly larger diameter than the outer periphery of the heat insulating member 26 so that an annular gap is formed that communicates through the spacing between the struts 30*c* between the outer chamber portion 22 and the inner chamber portion 24.

The mantle means 21 can be formed of any suitable material or composite of materials. It should be effective to minimize heat loss from the inner chamber portion 24 to the outer chamber portion 22 and must be able to withstand high temperatures (on the order of 2000° C. or higher) without melting or significant distortion. Such mantles are known in the art and may include layers of molybdenum, steel and aluminum silicate Located in the inner chamber 24 is heating means 32 that sits on a mushroom shaped base 34 which is provided with an insultation layer 34*a* to protect it from the furnace temperatures and which, in turn, seats on the inner surface of the base member 28. The heating means 32 is in the form of a frame member including legs 35 that support it on the enlarged portion of the base 34. Carried on the frame are a first resistance heater 36 spaced above the base 34 and a plurality of axially spaced resistance heaters 38*a*, 38*b* and 38*c* extending axially along the length of the cylindrical heat insulating member 26. These various resistance heaters can be individually controlled to provide a generally uniform temperature control throughout the height of the chamber 24. To accomplish this thermocouples (not shown) can extend into the inner chamber 24 and these can be connected into a control circuit in the power supply. An article holding member in the form of a cylindrical bucket 40 is carried within the confines of the heating means 32 and can include shelving or various support means for carrying article 42 to be processed in the press.

When the articles 42 are to be treated the pressure of the gas is raised to a high level, for example, 15,000 p.s.i. and higher. At the same time, the temperature of the gas is raised. In the inner chamber portion 24, a temperature of 2,000° C. or higher can be achieved. Because of the heat insulating mantle means 21 and because of the circulating coolant in the jacket 15 and passages 16, the temperature of the gas in the outer chamber portion 22 and in the region between the base members 28 and 34 are significantly lower. The temperature of the gas in the outer chamber portion 22 varies across the distance between the outer wall of the cylindrical member 26 and the inner wall of the pressure vessel 12. At the outer wall 26 the temperature can be on the order of about 200° C. and the inner wall of the vessel 12 can be on the order of about 50° C. Thus, there is a difference in the density of the gas between the inner and outer chamber portions and at the high pressures in the chamber, these differences are significant. If argon is used and if the pressure of the argon is about 15,000 p.s.i. and the temperature about 1300° C., the density of the cooler gas in the outer chamber portion 22 can be about 40 lb/ft$^3$. and in the inner chamber portion 24 can be about 15 lb/ft$^3$. If other gases, temperatures or pressures are used, these densities and their relationships will vary.

In accordance with this invention, the density difference is utilized to effect rapid cooling of the chamber and the articles 42 after the articles have been treated to provide for a shortened cycle time. This accelerated cooling time is provided by using a valve member 44 which is closed during the treatment time and open during the cooling time to set up a circulation loop of gas through the chamber portions 22 and 24. In this way the hot gas flows upwardly in the inner chamber portion 24 then downwardly through the outer chamber portion 22 and is cooled by contacting the cold pressure vessel 12. The cold gas returns through the open valve 44 to the inner chamber portion and cools the articles 42. This circulation loop along with its attendant large heat losses must be prevented during the initial heating and pressurizing portion of the cycle as well as during the actual treatment to minimize heat loss and to facilitate the maintenance of uniform temperature throughout the height of the inner chamber portion 24. Such heat losses in other than the cooling portion of the cycle would add to the power requirements of the heating means 32 and would impose severe difficulties in maintaining a uniform temperature throughout the inner chamber portion 24. Use of a valve allows flow when desirable and prevents flow when it is not desirable.

In the embodiment of the invention disclosed herein, the valve member 44 is located toward the bottom of the press 10 below the furnace base 34 so as to be exposed to the cooler gas. Thus, the difficulties and expense of providing a high temperature valve are obviated. To accomplish this, the configuration of the upper end of the mantle means 21 is important. The free end of the flange 30*b* must be located below the upper end of the cylindrical heat insulating member 26. When the press 10 is operational the denser cooler gas in the outer chamber portion 22 is below the less dense hotter gas in the inner chamber portion 24 at the lower end of the annular gap formed between the inner periphery of the flange 30*b* and the outer periphery of the cylindrical member 26. When the valve member 44 is closed an effective lock is there provided so that there is no flow of gas between the chamber portions 22 and 24 when the heat and pressure have been raised. When the valve member 44 is open, the previously described circulation flow occurs.

Any of a variety of valve members 44 can be utilized with this invention. That disclosed here includes a valve disc member 46 that overlies an annular port 48 formed in the base member 28 and that communicates with the outer chamber portion 22 and with the inner chamber portion 24. In practice, it has been found desirable to provide a soft copper gasket on the surfaces forming the inner and outer periphery of the port 48 to achieve an effective seal when the valve is closed. Located in the boss forming the annular port 48 is a bore 50 in which is slideably received a stem 52 projecting from the underneath side of the disc member 46. Seal means 54 is provided around the stem 52 to prevent leakage and the stem is axially shorter than the axial length of the bore 50. Thus, a space is provided between the bottom surface of the stem 52 and the bottom surface of the chamber 50 when the valve means 44 is closed. A spring member 56 is located around the outer surface of the boss and bears on the bottom of the annular port 48 and the bottom surface of the valve disc member 46. The spring 56 provides a bias urging the valve disc member 46 away from the upper surface of the port 48, that is, to an open position. When the chamber is filled with pressurized gas, the pressure in the inner chamber portion 24 acts on the entire surface area of the top of the disc member 46 and the pressure in the outer chamber portion 22 acts only on that bottom portion thereof overlying the annular port 48. Because of the area differential, a force differential is developed so that the valve 46 is kept in its closed position illustrated in FIG. 2 of the drawing, the spring force being insufficient to open the valve.

In order to open the valve means 44 any of a variety of mechanisms can be utilized. In the embodiment described herein the valve disc member 46 is pilot operated. There is thus provided a feed line 58 communicating between the inner chamber portion 24 and the bore 50. Control valves 60 and 62 are located in the feed line 58, the former between the inner chamber portion 24 and the bottom of the bore 50 and the latter between the bore 50 and the atmosphere. When the valve 60 is closed and valve 62 open there is low pressure in the bore 50 of such a small magnitude that the spring 56 cannot open the valve 44. When the valve 60 is open, and the valve 62 is closed, the gas in the chamber 24 feeds to the bore 50 and acts at the high pressure in that chamber to provide an additional pressure force acting on the bottom surface of the stem 52. Thus, the pressure forces acting on the valve 44 are substantially balanced. The spring 56 now forces the valve disc member 46 away from the port 48 and the valve 44 is open. When it is desired to close the valve 44, the valve 60 is closed and valve 62 is opened and the pressure in the bore 50 is vented to the atmosphere to allow the valve disc 46 to close by seating on the port 48.

Explaining the operation of the preferred embodiment of the press 10 just described, articles 42 to be treated by high temperature and pressure are placed in the holder 40 which, in turn, is placed in the confine defined by the resistance heating elements 36, **38*a*, 38*b* and 38*c*. Thereafter, the end plug 14 is closed to provide the interior, gas tight chamber. The vacuum pump (not shown) is now operated to evacuate the air and other reactive gases from the chamber through the passage 18. The inert gas, either argon, helium or other suitable gas, is fed into the chamber through the passage 20 and when the inert gas is at about one atmosphere of pressure, the feeding of the gas is discontinued and the vacuum pump is again operated to evacuate the chamber. This second evacuation need not be performed, but is preferred. The inert gas is again pumped into the chamber and the heating means 32 is energized to raise the temperature of the gas. The gas is pumped in until the desired pressure is achieved. When the desired pressure is achieved and the gas compressor is stopped and when the desired temperature is achieved the heaters are thereafter used only to maintain the desired temperature. In one process for treating the articles, the temperature of the gas was raised to 1300° C. and the pressure was raised to 15,000 p.s.i. Reaching this condition took approximately three hours and this condition was maintained to treat the articles for a period of about two hours. The heating means was then shut off and the press and articles 42** will now cool. In conventional systems, the cooling time and the time to reduce pressure took in the neighborhood of about thirteen hours to provide a total cycle time of about eighteen hours. With this invention, this thirteen hour cooling period has been reduced to about three hours so that the entire cycle time has been cut to about eight hours.

This accelerated cooling time is accomplished by allowing the gas from the hot inner chamber portion 24 to circulate through to the cooler outer chamber portion 22 where it is cooled and by letting the cooler gas in outer chamber portion 22 circulate through to the inner chamber portion 24 where it cools that chamber and the articles 42. The continuous circulation of the gas occurs until the temperature of the gas in the chamber portions are equalized. At this point there is no density difference and the flow stops. Other ways of cooling gas or other ways effecting circulation can be utilized in carrying out a method in accordance with this invention.

Mechanically, this circulation is accomplished by operating the control valve 60 and feeding the gas from chamber 24 to the bore 50 causing the valve to open. If desired a plurality of valves 44 can be provided to increase the circulation flow.

While the foregoing description of the invention stresses the reduced cycle time and resulting economies, it has been observed that a potential metallurgical benefit may result when treating certain articles. These benefits have not yet been completely confirmed or fully understood.

While in the foregoing, a preferred embodiment of a hot isostatic press in accordance with this invention has been described, it should be understood that various changes and modifications can be made without departing from the true spirit and scope of the invention as recited in the appended claims.

I claim:

1. A hot isostatic press comprising a vessel associated with cooling means around its outer surface and forming an interior chamber, heat insulating mantle means dividing said chamber into an inner chamber portion and an outer chamber portion, said chamber portions being in communication with each other and said inner chamber portion being operatively associated with heating means whereby gas in said inner chamber portion is relatively hot during operation, and whereby gas in said outer chamber portion is cooler, valve means between said inner and outer chamber portion for preventing or allowing the flow of gas through said chamber portions.

2. A hot isostatic press in accordance with claim 1 wherein said mantle means is sealed at its lower end and open at its upper end whereby the communication between said chamber portions is adjacent the upper end.

3. A hot isostatic press in accordance with claim 2 wherein said mantle means comprises a base member and a cylindrical member extending upwardly therefrom and being sealed therewith, said mantle means further comprising a cup shaped member having a planar portion adjacent to and spaced from the upper end of said cylindrical member and a flange portion extending downwardly from said planar portion adjacent to and spaced from the exterior of said cylindrical member.

4. A hot isostatic press in accordance with claim 2 wherein said valve means is located at the lower end of said mantle means.

5. A hot isostatic press in accordance with claim 4 wherein said valve means is arranged to be exposed to the cooler gas.

6. A hot isostatic press in accordance with claim 4 wherein said valve means is located in a bottom portion of said mantle means and wherein an additional heat insulating member overlies said valve means whereby it is exposed to the cooler gas.

7. A hot isostatic press is accordance with claim 3 wherein said valve means is located in said base member and is in communication with said chamber portions, an additional heat insulating base member being adjacent to said valve member and being spaced therefrom and from said cylindrical member.

8. A hot isostatic press in accordance with claim 7 wherein said valve means is pilot operated.

9. A hot isostatic press in accordance with claim 8 wherein first passage means communicates with said interior chamber and is adapted to be connected to a vacuum pump and second passage means also communicates with said interior chamber and is adapted to be connected to a source of inert gas, said source including pressurizing means.

* * * * *